United States Patent
Segre

(10) Patent No.: US 7,385,584 B2
(45) Date of Patent: Jun. 10, 2008

(54) AUTOMATED KEYBOARD MOUSE SWITCH

(75) Inventor: Marc Segre, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1892 days.

(21) Appl. No.: 09/779,306

(22) Filed: Feb. 7, 2001

(65) Prior Publication Data

US 2002/0105553 A1  Aug. 8, 2002

(51) Int. Cl.
*G09G 5/00* (2006.01)
(52) U.S. Cl. .................... 345/156; 345/157; 345/160; 345/163; 345/172; 345/173
(58) Field of Classification Search ............. 345/1, 345/2, 3, 156–157, 172–174, 179–180, 160–163; 178/18–19; 341/5, 15
See application file for complete search history.

(56) References Cited

U.S. PATENT DOCUMENTS

| | | | |
|---|---|---|---|
| 4,884,068 A | | 11/1989 | Matheny et al. |
| 5,581,269 A | | 12/1996 | Butcher |
| 5,585,821 A | | 12/1996 | Ishikura et al. |
| 5,748,189 A | | 5/1998 | Trueblood |
| 5,801,677 A | | 9/1998 | Obata |
| 5,923,307 A | * | 7/1999 | Hogle, IV .................... 345/1.3 |
| 5,956,019 A | * | 9/1999 | Bang et al. .................. 345/157 |
| 6,018,340 A | | 1/2000 | Butler et al. |
| 6,069,615 A | * | 5/2000 | Abraham et al. ............ 345/1.1 |
| 6,104,359 A | * | 8/2000 | Endres et al. ................ 345/3.1 |
| 6,266,236 B1 | * | 7/2001 | Ku et al. ..................... 361/681 |
| 6,340,957 B1 | * | 1/2002 | Adler et al. ................. 345/1.3 |
| 6,473,101 B1 | * | 10/2002 | Grigor et al. ............... 345/784 |

* cited by examiner

*Primary Examiner*—Richard Hjerpe
*Assistant Examiner*—Leonid Shapiro
(74) *Attorney, Agent, or Firm*—Jason O. Piche

(57) ABSTRACT

A single set of input devices (keyboard, mouse, etc.) is employed with a plurality of data processing systems each having a separate display. The logical display areas for the displays are arranged in a contiguous array to have common boundaries, with an edge (e.g., a right boundary or a lower boundary) of one logical display area coinciding with an edge of another logical display area (e.g., a left boundary or an upper boundary). When a cursor controlled by a pointing device is moved past a logical display area boundary which the current active data processing system shares in common with another data processing system, the active data processing system to which input device signals are transmitted is automatically switched to the other data processing system. No manual switching or hot-key sequence by the user is required, and the active data processing system may be automatically switch among any of a number of data processing systems simply by moving the cursor across logical display area boundaries between the data processing systems.

10 Claims, 2 Drawing Sheets

AUTOMATED KEYBOARD MOUSE SWITCH

BACKGROUND OF THE INVENTION

1. Technical Field

The present invention generally relates to improved concurrent use of multiple data processing systems and in particular to improved concurrent use of a single set of input devices (keyboard, mouse, etc.) enabling a user to interact with multiple data processing systems. Still more particularly, the present invention relates to an automatic keyboard/mouse switch enabling a single set of input devices to be employed by a user in interacting with multiple data processing systems without manual switching.

2. Description of the Related Art

Many data processing system users require the simultaneous use of multiple data processing systems, each system having a separate display and operating either separately from the remaining data processing systems or collaboratively as part of distributed system. For example, financial traders often need to be able to view and control several different systems at the same time in order to both receive required information from multiple sources and to concurrently make trades. Multiple systems are also frequently required for other reasons, such as where each workstation performs a dedicated function, redundancy is desired, etc.

Of course, user work space limitations or other practical considerations often preclude or inhibit the use of separate sets of input devices (such as a keyboard and mouse or other pointing device) for each of several data processing systems being concurrently employed by the user. Instead, a single set of input devices shared and switched between the multiple data processing systems is preferable. The current means for sharing input devices between multiple data processing systems generally requires the user to manually switch between the different data processing systems, either by operating a physical switch or entering a predefined keystroke sequence. Using a manual switch, the user can select the "active" data processing system (i.e., the data processing system to which user input through the keyboard or mouse is transmitted) by turning the switch to the appropriate position. Similarly, entry of a specific keystroke sequence allows the user to change the active system by signaling to the multiple systems that the change in active systems is desired.

All of the current solutions, however, require that the user interrupt the current task in order to manually perform the switch between multiple data processing systems. It would be desirable to provide a system, method, and computer program product which would allow the user to dynamically switch the active data processing system while continuing to work, and in the most unobtrusive manner possible.

SUMMARY OF THE INVENTION

It is therefore one object of the present invention to provide improved concurrent use of multiple data processing systems.

It is another object of the present invention to provide improved concurrent use of a single set of input devices (keyboard, mouse, etc.) enabling a user to interact with multiple data processing systems.

It is yet another object of the present invention to provide an automatic keyboard/mouse switch enabling a single set of input devices to be employed by a user in interacting with multiple data processing systems without manual switching.

The foregoing objects are achieved as is now described. A single set of input devices (keyboard, mouse, etc.) is employed with a plurality of data processing systems each having a separate display. The logical display areas for the displays are arranged in a contiguous array to have common boundaries, with an edge (e.g., a right boundary or a lower boundary) of one logical display area coinciding with an edge of another logical display area (e.g., a left boundary or an upper boundary). When a cursor controlled by a pointing device is moved past a logical display area boundary which the current active data processing system shares in common with another data processing system, the active data processing system to which input device signals are transmitted is automatically switched to the other data processing system. No manual switching or hot-key sequence by the user is required, and the active data processing system may be automatically switch among any of a number of data processing systems simply by moving the cursor across logical display area boundaries between the data processing systems.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
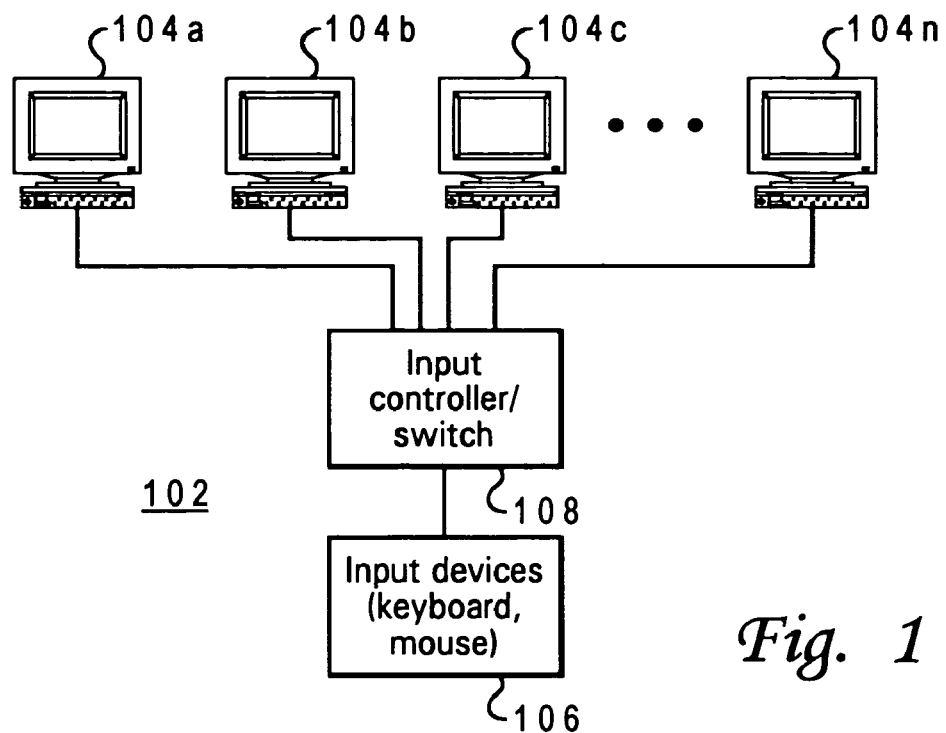
FIG. 1 depicts a set of data processing systems in accordance with a preferred embodiment of the present invention.

With reference now to the figures, and in particular with reference to FIG. 1, a set of data processing systems in accordance with a preferred embodiment of the present invention are depicted. Data processing system group 102 includes n data processing systems 104a-104n, where "n" is any positive integer. Each data processing system 104a-104n is complete, with the potential exception of user input devices, and may operate independently of or cooperatively with the remaining data processing systems. Each data processing system 104a-104n has a separate display.

A single set of user input devices 106 may be employed by a user to interact with any of the data processing systems 104a-104n. User input devices 106 include at least a pointing device such as a mouse, trackball or the like, and preferably also include a keyboard. User input devices 106 may optionally include, for example, a microphone, a video camera, etc. User input devices 106 are coupled to data processing systems 104a-104n via an input controller and switch 106, which operates as described in further detail below to automatically select an "active" data processing system. According to the preferred embodiment, the input devices 106 are preferably all Universal Serial Bus (USB) devices, and the input controller/switch 108 is connected to each data processing system 104a-104n via a USB port on each system.

Figure 2:
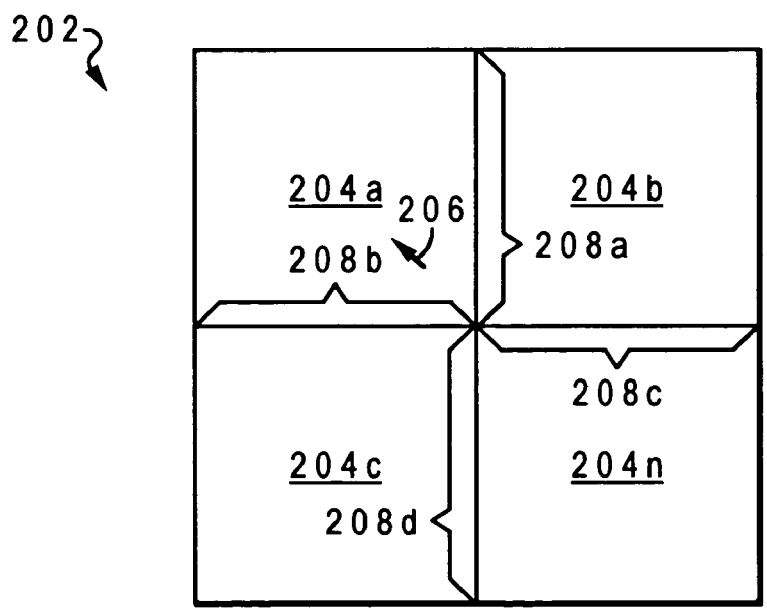
FIG. 2 is a diagram of the logical arrangement of data processing system logical display areas for a set of data processing systems employing automated input device switching in accordance with a preferred embodiment of the present invention.

Referring to FIG. 2, a diagram of the logical arrangement of data processing system logical display areas for a set of data processing systems employing automated input device switching in accordance with a preferred embodiment of the present invention is illustrated. In the example shown only four display areas are illustrated, although the present invention may be extended to include any number of display areas.

In the example shown, the logical arrangement 202 of display areas 204a-204n, which correspond on a one-to-one basis to data processing systems 104a-104n, is a checkerboard pattern, or an array of contiguous display areas having two rows and two columns. Other logical arrangements, such as larger sized arrays or a single linear row of display areas, may also be utilized with the present invention. Preferably, although not necessarily, the selected logical arrangement of logical display areas 204a-204n corresponds—at least with respect to positional relationships, although intermediate spacings may vary—to the physical arrangement of the actual, physical displays for data processing systems 104a-104n. That is, the logical arrangement 202 of display areas 204a-204n corresponds to a physical placement of the displays for data processing systems 104a-104n in a similar positional relationship (i.e., the display for data processing system 104a above the display for data processing system 104c and to the left of the display for data processing system 104b, etc.).

As known in the art, each display area 204a-204n has a logical size and includes an array or mapping of pixels which make up the display area. A pointing device or mouse employs pixel locations or coordinates for pixels within the array to define the position of the cursor within the logical display area. Movement of the pointing device results in the coordinates of the cursor changing, and corresponding movement of the position of the cursor within the display area.

Display areas 204a-204n are logical display areas, which typically occupy slightly less than the physical display area of the actual data processing system display. Logical display areas 204a-204n define the boundaries of the content displayed to the user on the display, with content falling outside the boundaries being suppressed or simply not displayed. In most conventional data processing systems, cursor movement within the logical display area is permitted up to but not beyond the boundaries.

In the present invention, display areas 204a-204n are logically arranged to have "common" boundaries. That is, the right boundary (as viewed) for display area 204a coincides with the left boundary for display area 204b; the lower boundary for display area 204a coincides with the upper boundary for display area 204c; the lower boundary for display area 204b coincides with the upper boundary for display area 204n; and the right boundary for display area 204c coincides with the left boundary for display area 204n. These "common" boundaries are treated as switch points between active systems.

Rather than suppressing or preventing cursor movement past a boundary of a display area 204a-204n which forms part of a "common" boundary, movement of the cursor 206 across a "common" boundary triggers an automatic switching of the input devices 106 from one data processing system 104a-104n corresponding to the display area in which the cursor originally started to another data processing system 104a-104n corresponding to the display into which the cursor crossed over.

For example, when data processing system 104a, corresponding to display area 204a, is initially the "active" data processing system to which signals from input devices 106 are routed and the cursor 206 is moved by the user across common boundary 208a from display areas 204a into display area 204b, the "active" data processing system is automatically switched to data processing system 104b, corresponding to display area 204b, and signals from input devices 106 are then routed to data processing system 104b until the cursor again crosses a common boundary between display areas.

Similarly, if the cursor 206 is moved by the user across common boundaries 208c and 208d, the active data processing system automatically switches, first to data processing system 104n corresponding to display area 204n and then to data processing system 104c corresponding to display area 204c. The process is also bi-directional. If the cursor 216 were initially in display area 204b and was moved by the user past common boundary 208a into display area 204a, the active data processing system would automatically switch from data processing system 104b, corresponding to display area 204b, to data processing system 104a, corresponding to display area 204a. The user may thus automatically switch between active data processing systems, without use of a manual switch or hot-key sequence, by simply manipulating a pointing device to move the cursor across a logical common boundary between two data processing systems.

Automatic switching of the "active" data processing system when the cursor crosses a common logical boundary between display areas may be accomplished in a number of different manners. The current active data processing system may detect movement of the cursor past a logical display area boundary which is common with the display area for another data processing system, and signal input controller/switch 108 via the USB bus to switch to a different data processing system identified within the switch request. Alternatively, input controller/switch 108 may be calibrated, in terms of the number of mouse events and display coordinates, to detect crossings of common boundaries between data processing systems. Input controller/switch 108 may then automatically switch the active data processing system upon detecting a common boundary for two logical display areas being crossed.

Locations within logical display areas 204a-204n, including the location of cursor 206, is normally defined by X, Y coordinates, with a zero X coordinate and a maximum X coordinate defining two boundaries of the logical display area and a zero Y coordinate and a maximum Y coordinate defining the other two boundaries. In the present invention, the maximum X coordinate of one display area (e.g., display area 204a) may be treated as logically equal to the zero X coordinate of another, adjoining display area (e.g., display area 204b), and similarly the zero Y coordinate of a display area (e.g., display area 204a) may be treated as logically equal to the maximum Y coordinate of another, adjoining display area (e.g., display area 204c).

When the X, Y coordinates of the cursor location change with the X coordinate exceeding the maximum X coordinate of the first display area or with the Y coordinate dropping below the zero Y coordinate for the first display area, the cursor location may be treated as exceeding the zero X coordinate or falling below the maximum Y coordinate of the adjoining display area by an equal amount. Following automatic switching of the input devices 106 to the corresponding data processing system, the cursor may be displayed within the adjoining display area at a location which is a distance past the zero or maximum X coordinate and/or the zero or maximum Y coordinate which corresponds to the number of mouse events (coordinate changes) generated by the pointing device after the common boundary was reached.

Although the example shown involves only four logical display areas/data processing systems, with each logical display area having two boundaries in common with other logical display areas, the present invention may be readily extended to any number of display areas and data processing systems in any desired configuration, with as many as all four boundaries for some logical display areas being in common with other logical display areas. For instance, the array 202 depicted in FIG. 2 could be extended to a 3×3 array of nine data processing systems/logical display areas, with the center logical display area having common boundaries on all four sides. Alternatively, the array 202 in FIG. 2 could be changed to a 1×4 array, or a single row of logical display areas.

Figure 3:
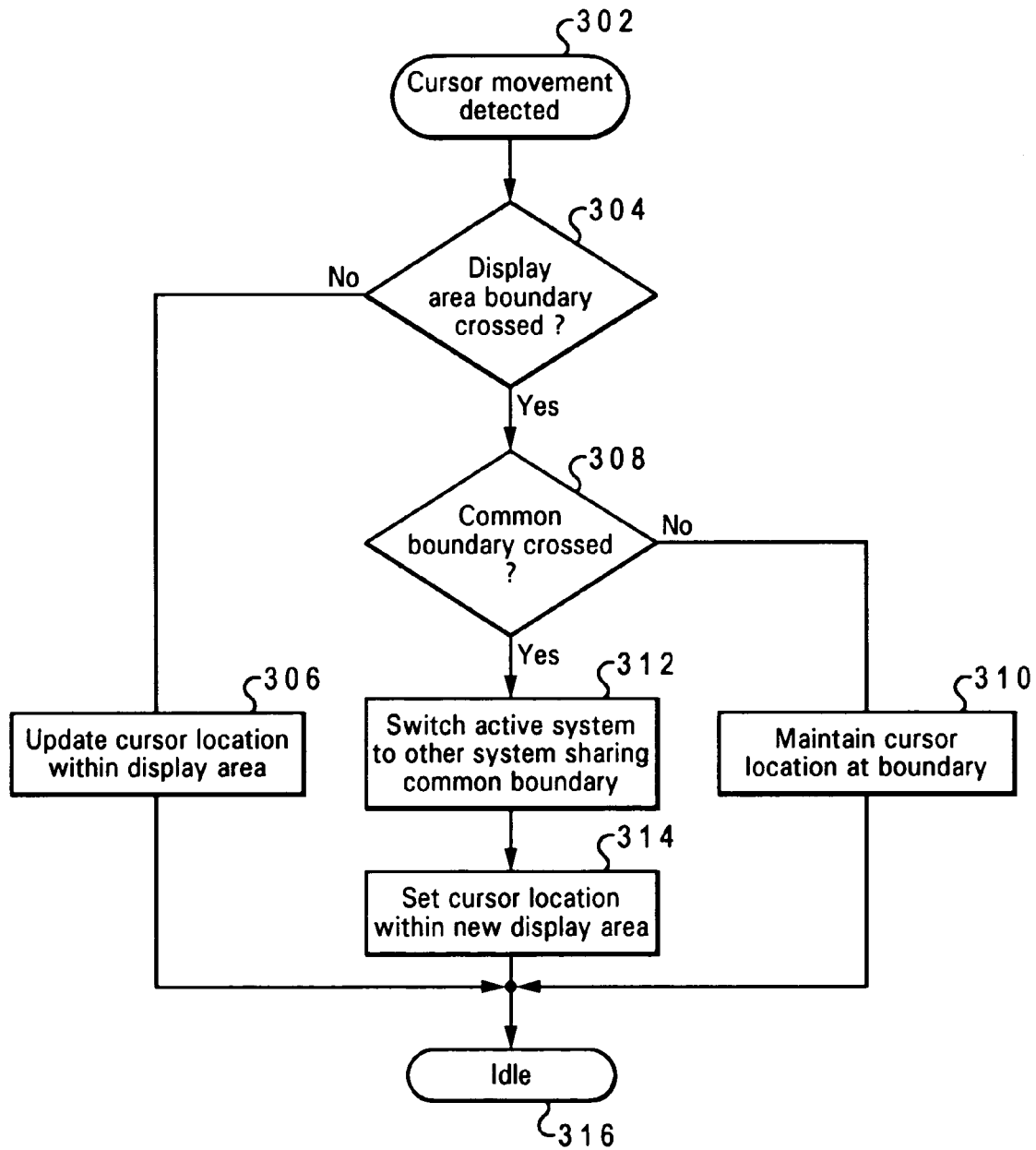
FIG. 3 depicts a high level flow chart for a process of automatically switching input devices between data processing systems in accordance with a preferred embodiment of the present invention.

With reference now to FIG. 3, a high level flow chart for a process of automatically switching input devices between data processing systems in accordance with a preferred embodiment of the present invention is depicted. The process begins at step 302, which depicts detection of cursor movement within the display area of an active data processing system receiving input signals from a set of common input devices shared by multiple data processing systems. The process first passes to step 304, which illustrates a determination of whether a boundary for the display area of the active data processing was crossed by movement of the cursor. If not the process proceeds to step 306, which depicts updating the cursor location within the display area of the active data processing system, which will result in updating the display image of the cursor within the display area.

If movement of the cursor causes the cursor location to cross a boundary (i.e., pass a zero or maximum X or Y coordinate), the process then proceeds instead to step 308, which illustrates a determination of whether the cursor movement crosses a common boundary between the display area for the active data processing system and an adjacent display area for another data processing system. If not, the process proceeds to step 310, which depicts maintaining the cursor location at the display area boundary, with the cursor location along a different coordinate axis (parallel to the display area boundary) and the cursor display image within the display area being updated if necessary I.e., the cursor movement was along both coordinate axes).

If movement of the cursor crosses a common boundary between two display areas, the process proceeds instead from step 308 to step 312, which illustrates the active data processing system to which input signals are transmitted from the data processing system corresponding to the original display area in which the cursor was depicted to the data processing system corresponding to the adjoining display area into which the cursor was moved. The process next passes to step 314, which depicts setting the cursor location within the new display area based on the cursor movement detected, which will result in the cursor image within the new display area being displayed at a corresponding location past the common boundary. The process then passes to step 316, which illustrates the process becoming idle until cursor movement is again detected.

The present invention allows input devices shared between data processing systems to be automatically switched based on a logical arrangement of display areas to form common boundaries and movement of a pointer-driven cursor past a common boundary. Manual, physical switching of the active data processing system receiving input signals from the common input devices is not required. Hot key switching by the user is also not required, together with knowledge of the logical arrangement of the data processing systems within a switching sequence when the logical display areas are arrangement to correspond to the positions of the physical displays.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A set of data processing systems operating utilizing a single set of input devices, comprising:
   a single set of input devices including a pointing device;
   at least two data processing systems sharing the single set of input devices, each data processing system having a logical display area logically arranged to have at least one boundary in common with a logical display area for another data processing system, wherein a pointer driven cursor controlled by the pointing device is located within a logical display area for an active data processing system receiving input signals from the single set of input devices; and
   switching means including an input controller coupled to said single set of input device and to each of said at least two data processing systems, wherein said switching means, responsive to the active data processing system signaling movement of the cursor past a logical common boundary between two logical display areas, for automatically switching transmission of signals from the single set of input devices from the active data processing system to another data processing system corresponding to a logical display area sharing the logical common boundary with the logical display area for the active data processing system, wherein the other data processing system becomes the active data processing system.

2. The set of data processing systems of claim 1, wherein the at least two data processing systems further comprise:
   an array of data processing system displays, each data processing system display corresponding to a different data processing system having a logical display area.

3. The set of data processing systems of claim 1, wherein the switching means further comprises:
   a universal serial bus connection of the single set of input devices to each data processing system.

4. The set of data processing systems of claim 2, further comprising:

a logical arrangement of display areas for the at least two data processing systems which corresponds to a physical configuration of display devices for the at least two data processing systems, wherein logical display areas for data processing systems having physically adjacent display devices share a logical common boundary.

5. A method for operating multiple data processing systems using a single set of input devices, said method comprising:

an active data processing system receiving signals from a pointing device within the single set of input devices controlling movement of a cursor within a first logical display area for the active data processing system;

responsive to movement of the cursor past a logical common boundary between the first logical display area and a second logical display area of an inactive data processing system, said active data processing system signaling an input controller coupled to said active data processing system and coupled to the inactive data processing system; and in response to said signaling by said active data processing system, said input controller automatically switching transmission of signals from the single set of input devices from the active data processing system to said inactive data processing system, such that the inactive data processing system becomes the active data processing system and input signals from the single set of input devices control movement of the cursor within the second logical display area.

6. The method of claim 5, further comprising:

connecting the data processing systems to the input controller utilizing a universal serial bus.

7. The method of claim 5, further comprising:

arranging logical display areas for the data processing systems to correspond to a physical configuration of display devices for the data processing systems, wherein logical display areas for data processing systems having physically adjacent display devices share a logical common boundary.

8. The method of claim 5, further comprising:

arranging logical display areas for the data processing systems in an array of contiguous logical display areas.

9. An automatic input switching device, comprising:

an input controller;

an input connection within the input controller for a single set of input devices including a pointing device;

output connections within the input controller for at least two data processing systems;

switching logic within the input controller at least two data processing systems transmitting input signals from the single set of input devices to an active data processing system, wherein the switching logic, responsive to receipt of signaling from the active data processing system indicative of movement of a cursor past a logical common boundary between the logical display area of the active data processing system and a logical display area for another data processing system, automatically switches transmission of the input signals from the single set of input devices from the active data processing system to said another data processing system, wherein said another data processing system becomes the active data processing system.

10. The automatic input switching device of claim 9, wherein the output connections further comprise universal serial bus connections.

* * * * *